United States Patent
Shih et al.

(10) Patent No.: US 11,522,643 B2
(45) Date of Patent: Dec. 6, 2022

(54) WIRELESS COMMUNICATION DEVICE AND WIRELESS COMMUNICATION METHOD

(71) Applicant: Realtek Semiconductor Corporation, Hsinchu (TW)

(72) Inventors: Ping-Ke Shih, Changhua County (TW); Chin-Yi Lin, Zhubei (TW); Yi-Shou Hsu, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 152 days.

(21) Appl. No.: 16/908,851

(22) Filed: Jun. 23, 2020

(65) Prior Publication Data
US 2021/0136624 A1  May 6, 2021

(30) Foreign Application Priority Data
Nov. 1, 2019 (TW) .................. 108139807

(51) Int. Cl.
H04L 1/00 (2006.01)
H04L 1/16 (2006.01)
H04W 28/04 (2009.01)
H04L 1/18 (2006.01)
H04W 28/02 (2009.01)

(52) U.S. Cl.
CPC .......... *H04L 1/1685* (2013.01); *H04L 1/1809* (2013.01); *H04L 1/189* (2013.01); *H04W 28/0278* (2013.01); *H04W 28/04* (2013.01)

(58) Field of Classification Search
CPC ......................... H04W 28/04; H04W 28/0278; H04L 1/1685; H04L 1/1809; H04L 1/189; H04L 1/1854; H04L 1/1835; H04L 2001/0097

USPC ................................................ 714/748–750
See application file for complete search history.

(56) References Cited

U.S. PATENT DOCUMENTS

| | | | | |
|---|---|---|---|---|
| 8,904,026 B2* | 12/2014 | Weigand | ................ | H04L 61/00 709/231 |
| 2003/0046032 A1* | 3/2003 | Puthiyedath | ............ | H04L 65/80 702/188 |
| 2006/0221825 A1* | 10/2006 | Okano | ................. | H04L 1/1874 370/229 |
| 2008/0049620 A1* | 2/2008 | Riga | .................. | H04W 56/004 370/236 |
| 2012/0257626 A1* | 10/2012 | McGhee | ............... | H04L 43/028 370/392 |
| 2015/0109942 A1* | 4/2015 | Nguyen | ................. | H04L 43/12 370/252 |
| 2019/0028575 A1* | 1/2019 | Wetterwald | ............ | H04L 45/34 |

(Continued)

*Primary Examiner* — Samir W Rizk
*Assistant Examiner* — Osman M Alshack
(74) *Attorney, Agent, or Firm* — Locke Lord LLP; Tim Tingkang Xia, Esq.

(57) ABSTRACT

A wireless communication device is disclosed. The wireless communication device includes a processor, a transceiver coupled to the processor, and a memory coupled to the processor. The memory is configured to store a plurality of instructions and the plurality of instructions are executed by the processor to perform operations of storing, in the memory, a duplication of each of the plurality of packets transmitted by a streaming provider; and in response to a request of retransmission transmitted by a terminal device for a lost packet, determining whether the duplication of the lost packet is stored in the memory.

18 Claims, 5 Drawing Sheets

(56) References Cited

U.S. PATENT DOCUMENTS

| | | | | |
|---|---|---|---|---|
| 2019/0200273 A1* | 6/2019 | Pedersen | ............... | H04L 47/32 |
| 2019/0334825 A1* | 10/2019 | Nadas | ............... | H04L 47/18 |
| 2020/0045596 A1* | 2/2020 | Liu | ............... | H04W 36/0072 |
| 2020/0187282 A1* | 6/2020 | Yu | ............... | H04L 5/0055 |
| 2020/0195535 A1* | 6/2020 | Smith | ............... | G06Q 30/0201 |
| 2020/0220805 A1* | 7/2020 | Dhanabalan | ............... | H04L 63/20 |
| 2021/0029766 A1* | 1/2021 | Zhang | ............... | H04W 72/0453 |
| 2021/0235470 A1* | 7/2021 | Katayama | ............... | H04W 72/1247 |

\* cited by examiner

WIRELESS COMMUNICATION DEVICE AND WIRELESS COMMUNICATION METHOD

CROSS-REFERENCE TO RELATED APPLICATION

This application claims priority to and the benefit of Taiwan Application Serial Number 108139807, filed on Nov. 1, 2019, the entire content of which is incorporated herein by reference as if fully set forth below in its entirety and for all applicable purposes.

BACKGROUND

Field of Disclosure

The disclosure generally relates to a device and a method, and more particularly, to a wireless communication device and a wireless communication method.

Description of Related Art

In the field of live streaming, when any packet is lost, the terminal device can only request the streaming provider for retransmitting the lost packet and decide whether the lost part can be played in time. If the lost part can not be played in time, the terminal device will not transmit the request of retransmission. That is to say, the routing time, from the streaming provider to the terminal device, is the metic for the terminal device whether to require the retransmission. The live streaming service demands for immediacy, however, the latency degenerates the video-playing quality.

SUMMARY

The disclosure can be more fully understood by reading the following detailed description of the embodiments, with reference made to the accompanying drawings as described below. It should be noted that the features in the drawings are not necessarily to scale. The dimensions of the features may be arbitrarily increased or decreased for clarity of discussion.

One aspect of the present disclosure is to provide a wireless communication device that includes a processor, a transceiver coupled to the processor, and a memory coupled to the processor. The memory is configured to store a plurality of instructions and the plurality of instructions are executed by the processor to perform operations of storing, in the memory, a duplication of each of the plurality of packets transmitted by a streaming provider; and in response to a request of retransmission transmitted by a terminal device for a lost packet, determining whether the duplication of the lost packet is stored in the memory.

Another aspect of the present disclosure is to provide a wireless communication method, which is configured for a wireless communication device and at least one terminal device. The terminal device receives streaming data of a streaming provider through the wireless communication device. The streaming data includes a plurality of packets. The wireless communication method includes the following steps of storing, by a processor of the wireless communication device, a duplication of each of the plurality of packets transmitted by the streaming provider in memory of the wireless communication device; and in response to a request of retransmission transmitted by a terminal device for a lost packet, determining whether the duplication of the lost packet is stored in the memory by the processor.

It is to be understood that both the foregoing general description and the following detailed description are by examples, and are intended to provide further explanation of the disclosure as claimed.

DETAILED DESCRIPTION

Figure 1:
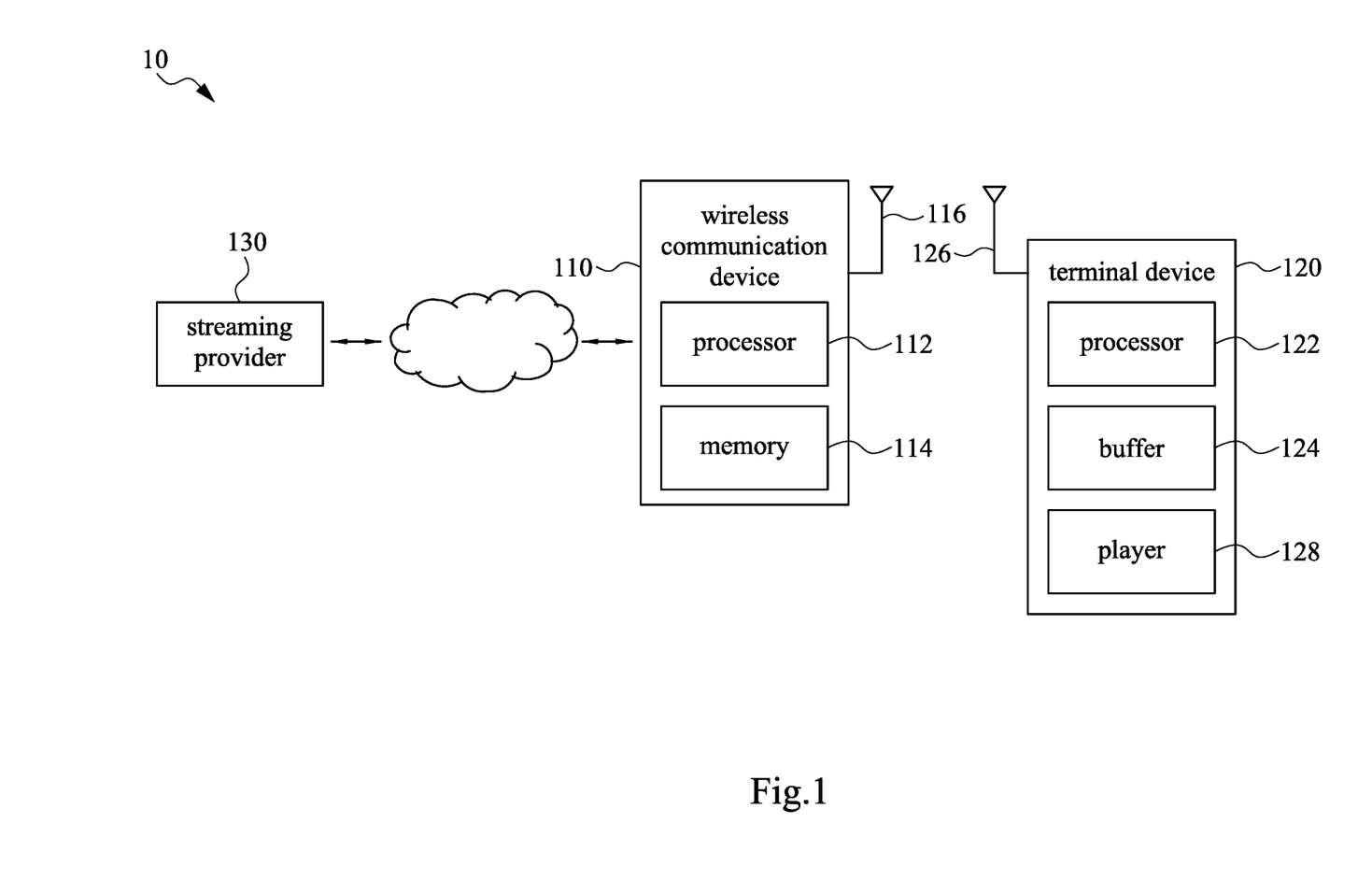
FIG. 1 is a configuration diagram of a live streaming system according to some embodiments of the present disclosure.

Reference is made to FIG. 1, which illustrates a configuration diagram of a live streaming system 10 according to some embodiments of the present disclosure. In the live streaming system 10, the streaming provider 130 is configured to provide a live streaming service. In some embodiments, the terminal device 120 applies the live streaming protocol with the wireless communication device 110 and the streaming provider 130, such that the terminal device 120 receives streaming data. The streaming data includes a plurality of packets. The terminal device 120 plays realtime videos according to the packets.

As shown in FIG. 1, the wireless communication device 110 includes a processor 112, a memory 114, and a transceiver 116. The processor 112 is coupled to the memory 114 and the transceiver 116. In some embodiments, the wireless communication device 110 is a wireless access point device. The wireless communication device 110 is configured for the wireless local area network, such as the IEEE 802.11 standard.

The terminal device 120 includes a processor 122, a buffer 124, a transceiver 126, and a player 128. The processor 122 is coupled to the buffer 124, the transceiver 126, and the player 128. The terminal device 120 is a personal computer, a mobile phone, and so on.

Figure 2A:
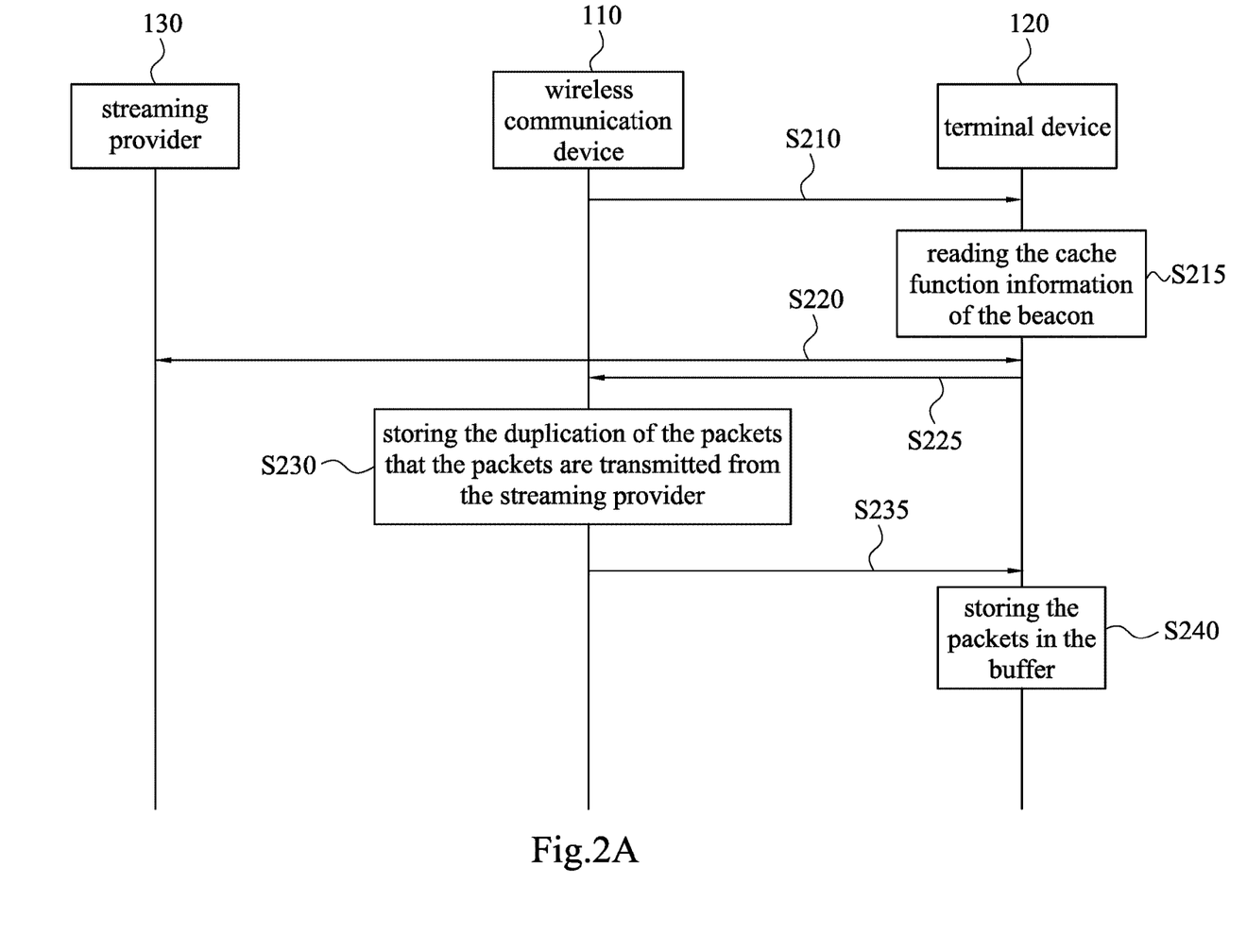
FIG. 2A to FIG. 2C are flow charts illustrating a wireless communication method according to some embodiments of the present disclosure.

Reference is made to FIG. 2A incorporated with FIG. 1. FIG. 2A is a flow chart illustrating a wireless communication method according to some embodiments of the present disclosure.

In step S210, the wireless communication device 110 broadcasts a beacon through the transceiver 116.

In some embodiments, the beacon includes a cache function information. For example, the wireless communication device 110 transmits the beacon periodically for the potentially connectable devices (e.g. the terminal device 120) to access the wireless network service. Furthermore, the wireless communication device 110 broadcasts the beacon that the wireless communication device 110 is configured for the cache function.

In step S215, the terminal device 120 reads the cache function information of the beacon.

In some embodiments, the terminal device 120 gets, from the cache function information, the information that the wireless communication device 110 supports the streaming cache function. The cache function information indicates the retransmission mechanism of the terminal device 120 for the live streaming.

In step S220, after the handshake procedure of the streaming protocol between the terminal device 120 and the streaming provider 130 is finished, a connection is established.

In some embodiments, the player 128 of the terminal device 120 includes a graphical user interface (e.g. a video player) or a hardware interface to provide the user to choose which multimedia to watch.

In step S225, the wireless communication device 110 acquires an IP (Internet protocol) address of the terminal device 120 and a communication port of the terminal device 120.

In some embodiments, the wireless communication device 110 analyzes a format of the packet which is transmitted by the terminal device 120 to obtain both the IP address and the communication port of the terminal device 120. In some other embodiments, the terminal device 120 directly transmits the information of both the IP address and the communication port to the wireless communication device 110. Therefore, the wireless communication device 110 can identify the terminal device 120 according to the IP address and the communication port after receiving the packets of the media stream.

In some embodiments, a packet format can be, but not limited to, the format of the Real-time Transport Protocol (RTP). The wireless communication device 110 analyzes the header of the packet to acquire, for example, the sequence number, the timestamp, the synchronization source identifier (SSRC), and so on and to automatically acquire the IP address and the communication port of the terminal device 120.

In step S230, the wireless communication device 110 stores the duplication of the packets that the packets are transmitted from the streaming provider 130.

In some embodiments, the terminal device 120 and the wireless communication device 110 are connected to the Wi-Fi network. The terminal device 120 receives, through the wireless communication device 110, the packet of the live streaming from the streaming provider 130, and stores the packets in a cache block in the memory 114. For example, the duplication of each packet and the duplicate order of the duplication of each packet are stored in the cache block. The duplicate order corresponds to the packet order of the packets. The duplicate order indicates which packet the duplication corresponds to.

In some embodiments, the wireless communication device 110 analyzes both the packet format and the packet content of the stream packet, for example, the sequence number, the timestamp, and the synchronization source identifier (SSRC) of the packet format in RTP. If the determinations are made that the packet format satisfied the format, such as the RTP, the sequence number and the timestamp have the linear relation, and the packets have the same synchronization source identifier, the packets of the live streaming are stored in the cache block of the memory 114.

In some embodiments, the space of the cache block is represented as the formula 1:

$$M = D \times P_{max} \times F \times R \qquad \text{formula 1}$$

In formula 1, M is the space of the cache block; D is the time that the packets are cached; $P_{max}$ is the size of the largest packet; F is the frequency that the streaming provider 130 transmits the packets; R is the packet loss rate.

In step S235, the wireless communication device 110 transmits the packets to the terminal device 120.

In step S240, the terminal device 120 stores the packets in the buffer 124.

In some embodiments, after the terminal device 120 receives the packets, the terminal device 120 transmits an acknowledgment packet (ack) to the wireless communication device 110. At this time, the wireless communication device 110 deletes, in the memory 114, the duplication whose duplicate order corresponds to the packet order according to the packet order indicated in the acknowledgment packet, such that the space of the cache block in the memory 114 is kept available. In some other embodiments, the wireless communication device 110 deletes the duplication whose staying time (in the cache) is the oldest or whose duplicate order is the smallest when the space of the cache block is going to be full, such that the cache block can store new duplications.

In some embodiments, the terminal device 120 checks the sequences of the packets which are stored continuously in the buffer 124 to determine whether any packet is lost.

Figure 2B:
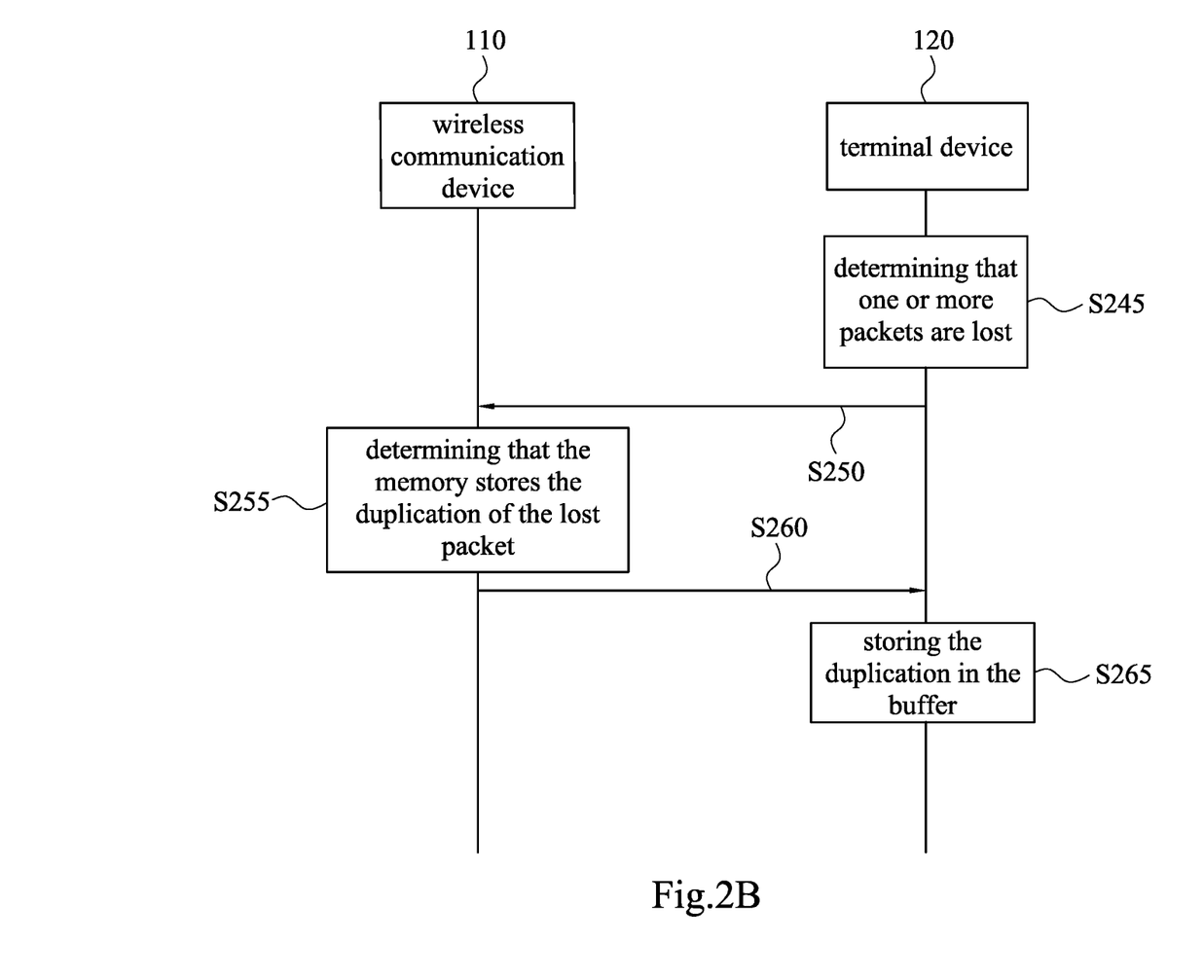

Reference is made to FIG. 2B incorporated with FIG. 1. FIG. 2B is a flow chart illustrating a wireless communication method according to some embodiments of the present disclosure.

In step S245, the terminal device 120 determines that one or more packets are lost.

In some embodiments, the buffer 124 of the terminal device 120 is configured to store data with a continuous sequence. If a determination is made that any packet is lost according to the continuous sequence, step S250 is performed.

In step S250, the terminal device 120 transmits a request of retransmission associated with the lost packet.

In some embodiments, the terminal device 120 determines whether the wireless communication device 110 supports the cache function.

In some embodiments that the wireless communication device 110 supports the cache function, the terminal device 120 determines whether a retransmission time (hereinafter referred to as "first retransmission time") is smaller than a predicted-playing time. The first retransmission time is the sum of a current video time and a travel time that the duplication of the lost packet is transmitted, by the wireless communication device 110, to terminal device 120. The predicted-playing time is the video time which the lost packet corresponds to. In some other embodiments, the first retransmission time further includes the time that the aforesaid sum of time adds the travel time of the request of retransmission transmitted from the terminal device 120 to the wireless communication device 110.

Figure 3:
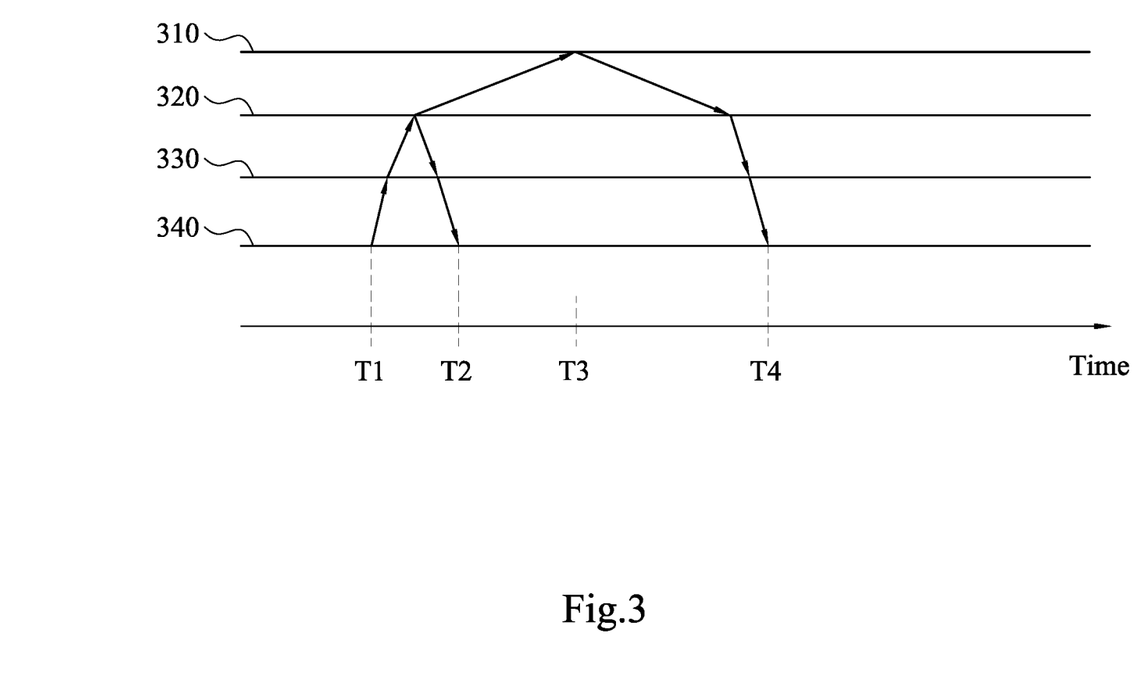
FIG. 3 is a diagram illustrating a time series for transmitting packets according to some embodiments of the present disclosure.

Reference is made to FIG. 3, which is a diagram illustrating a time series for transmitting packets according to some embodiments of the present disclosure. Line 310 represents the time series for the streaming provider 130. Line 320 represents the time series for the terminal device 120. Line 330 represents the time series for the transceiver 126 of the terminal device 120. Line 340 represents the time series for the player 128 of the terminal device 120.

As shown in FIG. 3, the player 128 detects the lost packet at time T1, then the player 128 informs the transceiver 126 of the terminal device 120 to retransmit (Line 340 to Line 330) and then the terminal device 120 transmits the request of retransmission (Line 330 to Line 320). Then, the terminal device 120 receives a feedback packet (Line 320 to Line 330), and the player 128 plays the data of the feedback packet at time T2. FIG. 3 shows the time gap between the time T1 and the time T2.

For example, the time gap between the time T2 and the time T1 is 5 milliseconds. The current video time, at the player 128, is 1:25:00 (it is also the time T1 that the player 128 detects some packets are lost). The data of the lost packet corresponds to the video time (hereinafter referred to as "predicted-playing time"), 1:25:30~1:25:40 (taking the example that each lost packet carries the video length, 10 milliseconds). The time gap (e.g., 5 milliseconds) is added to the current video time 1:25:00 to get the sum, i.e., the video time 1:25:05. Because the video time (i.e., 1:25:05) is smaller than the predicted-playing time (i.e., 1:25:30), the terminal device 120 determines that it can play the video segment in time after receiving the feedback data. In the embodiment, the terminal device 120 will transmit the request of retransmission for the lost packet.

In some other embodiments, the time gap between the time T1 and the time T2 is 5 milliseconds. The current video time is 1:25:00, and the predicted-playing time is 1:25:05~1:25:15 (the video time corresponds to the lost packet). The sum of the current video time 1:25:00 and the time gap (5 milliseconds) is the video time 1:25:05. Because the video time is equal to the predicted-playing time, it means that the terminal device 120 can not play the video segment in time after receiving the feedback data. In the embodiment, the terminal device 120 will not transmit the request of retransmission for the lost packet.

If the wireless communication device 110 determines that the terminal device 120 supports the cache function, and the wireless communication device 110 receives the request of retransmission, the following steps are performed.

The wireless communication device 110 determines, according to the sequence of the packet which is requested for retransmission, whether the memory 114 stores the duplication of the lost packet.

Reference is made to FIG. 2B again. In step S255, the wireless communication device 110 determines that the memory 114 stores the duplication of the lost packet.

In some embodiments, the packet whose packet sequence is #105 is lost. If the memory 114 stores the data corresponding to the sequence #105, it means that the wireless communication device 110 does not have to transmit the request of retransmission to the destination which is indicated in the request of retransmission (i.e., the destination is the streaming provider 130). In some other embodiments, the wireless communication device 110 drops the request of retransmission.

In step S260, the wireless communication device 110 transmits the duplication to the terminal device 120.

In some embodiments, after the terminal device 120 receives the duplicate packet, the terminal device 120 transmits the acknowledgment packet to the wireless communication device 110. At this time, the wireless communication device 110 deletes, in the memory 114, the duplication whose duplicate order corresponds to the packet order according to the packet order indicated in the acknowledgment packet.

In step S265, the terminal device 120 stores the duplication in the buffer 124.

In some embodiments, the wireless communication device 110 can serve more than one terminal device 120. Because the wireless network environment is the contention environment, the lost packet can happen in the terminal device 120. In the wireless communication method of the present disclosure, the wireless communication device 110 can directly provide the duplication to the terminal device 120, such that the time that the terminal device 120 waits for the feedback of the streaming provider 130 is eliminated, and the live streaming service in the wireless communication environment is improved that the video can be played more fluently.

Figure 2C:
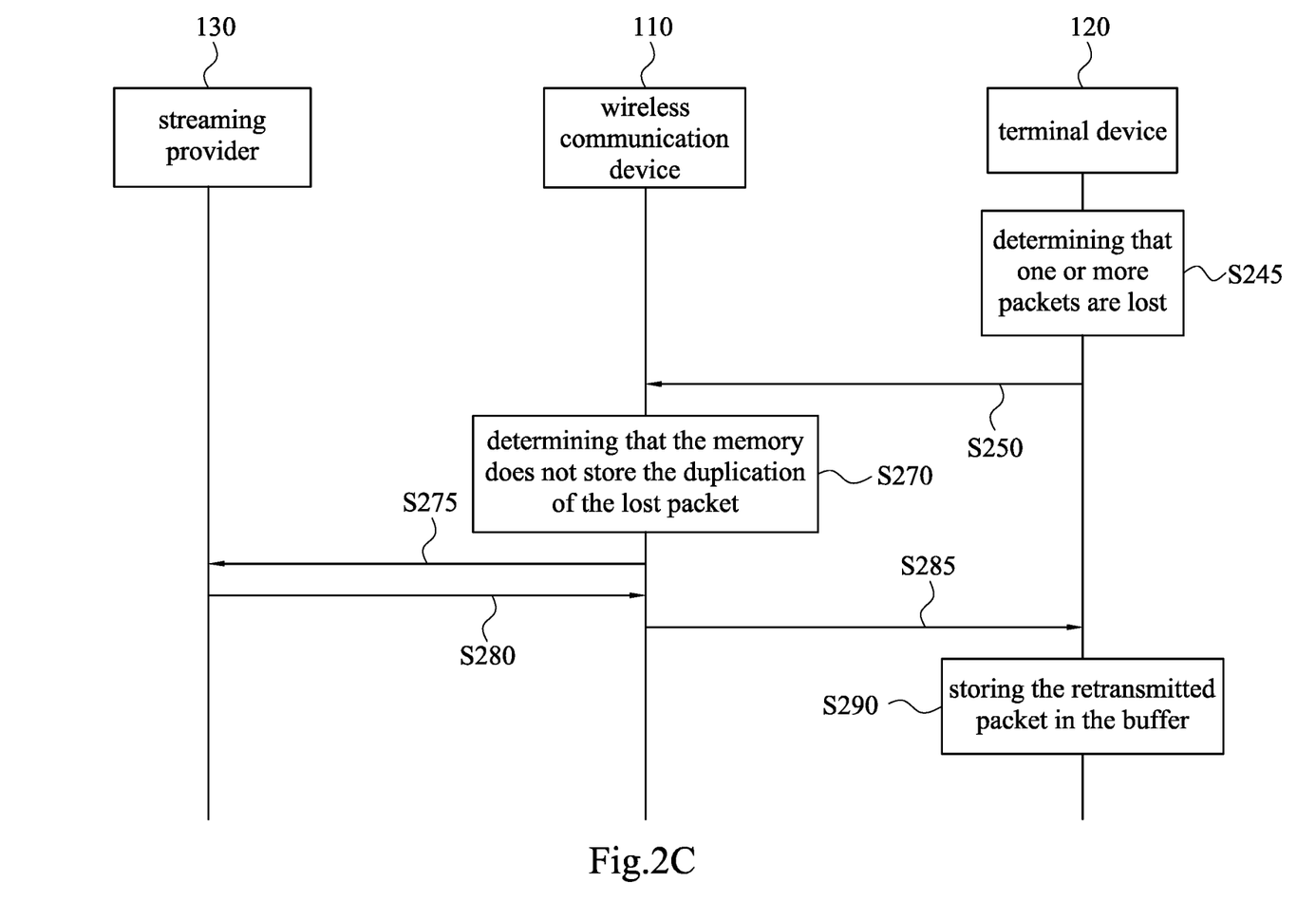

Reference is made to FIG. 2C incorporated with FIG. 1. FIG. 2C is a flow chart illustrating a wireless communication method according to some embodiments of the present disclosure. The step S245 in FIG. 2C is described above.

Furthermore, the terminal device 120 will determine whether to transmit the request of retransmission. Reference is made to FIG. 3 again. Time T3 represents the time that the streaming provider 130 receives the request of retransmission and the streaming provider 130 is ready to transmit the retransmitted packet. Time T4 represents the time that the player 128 plays the data after the terminal device 120 receives the retransmitted packet. Therefore, the time gap between the time T1 and the time T4 (hereinafter referred to as "second retransmission time") represents the time gap between the time that the player 128 detects the lost packet and the time that the player 128 can play the data of the retransmitted packet.

The terminal device 120 will determine whether both the first retransmission time and the second retransmission time is smaller than the predicted-playing time to decide that the request of retransmission should be transmitted or not.

For example, the time gap between the time T4 and the time T1 is 40 milliseconds. The current video time is 1:25:00. The data of the lost packet corresponds to the video time, 1:26:30~1:26:40. The time gap (e.g., 40 milliseconds) is added to the current video time 1:25:00 to get the sum, i.e., the video time 1:25:40. Because the video time (i.e., 1:25:40) is smaller than the predicted-playing time 1:26:30, the terminal device 120 can play the video segment in time after receiving the feedback data. In the embodiment, the terminal device 120 will transmit the request of retransmission for the lost packet.

In some other embodiments, the time gap between the time T1 and the time T4 is 40 milliseconds. The current video time is 1:25:00. The data of the lost packet corresponds to the video time 1:25:30~1:25:40. The sum of the current video time 1:25:00 and the time gap (40 milliseconds) is the video time 1:25:40. Because the video time 1:25:40 is smaller than the predicted-playing time 1:25:30, it means that the terminal device 120 can not play the video segment in time after receiving the feedback data. In the embodiment, the terminal device 120 will not transmit the request of retransmission for the lost packet. It should be noted that the airtime of the packet from the streaming provider 130 to the terminal device 120 depends on the condition of the wireless environment. For example, the more the number of routers that forward the packets from the streaming provider 130 to the wireless communication device 110 is, the longer the physical distance is. Therefore, the retransmission time is long.

In step S250, the wireless communication device 110 determines, according to the packet order of the request of retransmission, whether the memory 114 stores the duplication of the lost packet.

In step S270, the wireless communication device 110 determines that the memory 114 does not store the duplication of the lost packet. The packet could be lost at the side of the wireless communication device 110.

In step S275, the wireless communication device 110 transmits the request of retransmission to the streaming provider 130. The wireless communication device 110 transmits the request of retransmission which is transmitted by the terminal device 120 in step S250.

In step S280, the streaming provider 130 transmits a retransmitted packet.

In step S285, the wireless communication device 110 forwards the retransmitted packet to the terminal device 120.

In step S290, the terminal device 120 stores the retransmitted packet in the buffer 124.

As described above, the terminal device in the present disclosure estimates, at first, the airtime of the packet from the wireless communication device to the terminal device (i.e., the first retransmission time). Because the airtime of the packet from the streaming provider to the terminal device (i.e., the second retransmission time) is much longer than the first retransmission time, when the packet is lost, the terminal device will not tend to abstain from transmitting the request of retransmission. Furthermore, the cache mechanism of the wireless communication device makes the terminal device obtain the lost data with high probability. Subsequently, the player can get the retransmitted data for the lost data in a short time. Furthermore, before the player plays the movie segment of the lost data, the movie segment can be retransmitted immediately and can be received by the player in time, to improve the quality of the live streaming service.

What is claimed is:

1. A wireless communication device, comprising:
    a processor;
    a transceiver coupled to the processor;
    a memory coupled to the processor, wherein the memory is configured to store a plurality of instructions and the plurality of instructions are executed by the processor to perform operations of:
        storing, in the memory, a duplication of each of a plurality of packets transmitted by a streaming provider; and
        in response to a request of retransmission transmitted by a terminal device for a lost packet, determining whether the duplication of the lost packet is stored in the memory;
    wherein when the terminal device determines that a first retransmission time is smaller than a predicted-playing time, the terminal device transmits the request of retransmission to the transceiver, wherein the first retransmission time is a sum of a current video time and a travel time that the duplication of the lost packet is transmitted, by the transceiver, to the terminal device, and the predicted-playing time is corresponding to a video time of the lost packet.

2. The wireless communication device of claim 1, wherein the processor is further configured to execute the plurality of instructions to perform operations of:
    when the duplication of the lost packet is stored in the memory, controlling the transceiver to transmit the duplication of the lost packet to the terminal device.

3. The wireless communication device of claim 1, wherein the processor is further configured to execute the plurality of instructions to perform operations of:
    when the duplication of the lost packet is not stored in the memory, transmitting the request of retransmission to the streaming provider.

4. The wireless communication device of claim 1, wherein the processor is further configured to execute the plurality of instructions to perform operations of:
    broadcasting a beacon, wherein the beacon comprises a cache function information.

5. The wireless communication device of claim 4, wherein after the terminal device reads the cache function information, in response to detecting the lost packet, the terminal device determines that the first retransmission time is smaller than the predicted-playing time, the terminal device transmits the request of retransmission that a destination is the streaming provider to the transceiver.

6. The wireless communication device of claim 4, wherein before the terminal device reads the cache function information, in response to detecting the lost packet, the terminal device determines that a second retransmission time is smaller than the predicted-playing time, the terminal device transmits the request of retransmission that a destination is the streaming provider to the transceiver, such that the transceiver transmits the request of retransmission to the streaming provider, wherein the second retransmission time is a sum of the current video time and a travel time that a retransmitted packet corresponding to the lost packet is retransmitted, by the streaming provider, to the terminal device.

7. The wireless communication device of claim 1, wherein the memory is configured to store the duplication and a duplicate order of the duplication, wherein the processor is further configured to execute the plurality of instructions to perform operations of:
    after obtaining an acknowledgment packet transmitted by the terminal device, deleting, according to a packet order of the acknowledgment packet, the duplication whose duplicate order is associated with the packet order in the memory.

8. The wireless communication device of claim 1, wherein the processor is further configured to execute the plurality of instructions to perform operations of:
    recording the duplication of each of the plurality of packets to the memory according to an IP address of the terminal device and a communication port of the terminal device.

9. The wireless communication device of claim 1, wherein the terminal device comprises a buffer and a player, wherein the buffer is configured to store the plurality of packets, and the player is configured to play a live streaming video according to the packet order.

10. A wireless communication method, which is configured for a wireless communication device and at least one terminal device, the terminal device receiving a streaming data of a streaming provider through the wireless communication device, the streaming data comprising a plurality of packets, wherein the wireless communication method comprising:
    storing, by a processor of the wireless communication device, a duplication of each of the plurality of packets transmitted by the streaming provider in a memory of the wireless communication device; and
    in response to a request of retransmission transmitted by a terminal device for a lost packet, determining whether the duplication of the lost packet is stored in the memory by the processor;
    wherein when a determination is made by the terminal device that a first retransmission time is smaller than a predicted-playing time, the request of retransmission is transmitted, by the terminal device, to a transceiver, wherein the first retransmission time is a sum of a current video time and a travel time that the duplication of the lost packet transmitted by the transceiver to the terminal device, and the predicted-playing time is corresponding to a video time of the lost packet.

11. The wireless communication method of claim 10, further comprising:
when a determination is made that the duplication of the lost packet is stored in the memory, controlling a transceiver to transmit the duplication of the lost packet to the terminal device.

12. The wireless communication method of claim 10, further comprising:
when a determination is made that the duplication of the lost packet is not stored in the memory, transmitting the request of retransmission to the streaming provider.

13. The wireless communication method of claim 10, further comprising:
broadcasting, by the wireless communication device, a beacon, wherein the beacon comprises a cache function information.

14. The wireless communication method of claim 13, further comprising:
after the cache function information is read by the terminal device, in response to detecting the lost packet, a determination is made by the terminal device that the first retransmission time is smaller than the predicted-playing time, the request of retransmission that a destination is the streaming provider is transmitted, by the terminal device, to the transceiver.

15. The wireless communication method of claim 13, further comprising:
before the cache function information is read by the terminal device, in response to detecting the lost packet, when a determination is made by the terminal device that a second retransmission time is smaller than the predicted-playing time, the request of retransmission that a destination is the streaming provider is transmitted, by the terminal device, to the transceiver, such that the request of retransmission is transmitted, by the transceiver, to the streaming provider, wherein the second retransmission time is a sum of the current video time and a travel time that a retransmitted packet corresponding to the lost packet is transmitted, by the streaming provider, to the terminal device.

16. The wireless communication method of claim 10, wherein the memory is configured to store the duplication and a duplicate order of the duplication, wherein the wireless communication method further comprises:
after an acknowledgment packet transmitted by the terminal device is obtained, deleting, according to a packet order of the acknowledgment packet, the duplication whose duplicate order is associated with the packet order in the memory.

17. The wireless communication method of claim 10, further comprising:
recording the duplication of each of the plurality of packets to the memory according to an IP address of the terminal device and a communication port of the terminal device.

18. The wireless communication method of claim 17, further comprising:
analyzing a header, a timestamp, and a synchronization source identifier of each of the plurality of packets to obtain the IP address and the communication port.

* * * * *